(12) United States Patent
Budz et al.

(10) Patent No.: US 7,889,894 B2
(45) Date of Patent: Feb. 15, 2011

(54) METHOD OF NAVIGATION IN THREE-DIMENSIONAL IMAGE DATA

(75) Inventors: Sebastian Budz, Erlangen (DE); Robert Schneider, Roβtal (DE)

(73) Assignee: Siemens Aktiengesellschaft, Munich (DE)

( * ) Notice: Subject to any disclaimer, the term of this patent is extended or adjusted under 35 U.S.C. 154(b) by 935 days.

(21) Appl. No.: 10/580,687

(22) PCT Filed: Nov. 22, 2004

(86) PCT No.: PCT/EP2004/053041

§ 371 (c)(1),
(2), (4) Date: May 26, 2006

(87) PCT Pub. No.: WO2005/052864

PCT Pub. Date: Jun. 9, 2005

(65) Prior Publication Data

US 2007/0115204 A1    May 24, 2007

Related U.S. Application Data

(60) Provisional application No. 60/525,775, filed on Nov. 28, 2003.

(30) Foreign Application Priority Data

Nov. 28, 2003    (DE) ................................. 103 56 272

(51) Int. Cl.
*G06K 9/00* (2006.01)

(52) U.S. Cl. ........................ 382/128; 382/100; 382/131; 382/294; 382/204; 382/206; 345/6; 345/424; 700/29; 700/31; 700/118

(58) Field of Classification Search ................. 382/128, 382/131, 294, 154, 203, 204, 206; 345/6, 345/424; 434/403, 211, 256, 257; 700/29, 700/31, 98, 118

See application file for complete search history.

(56) References Cited

U.S. PATENT DOCUMENTS 5,170,347 A * 12/1992 Tuy et al. .................... 345/419

(Continued)

OTHER PUBLICATIONS

An integrated visulaization system for surgical planning and guidance using image fusion and an open MR, 2001.*

(Continued)

*Primary Examiner*—Vikkram Bali
*Assistant Examiner*—Nancy Bitar
(74) *Attorney, Agent, or Firm*—Harness, Dickey & Pierce, P.L.C.

(57) ABSTRACT

A method of navigation in three-dimensional, electronic image data sets is disclosed, whereby the image data sets contain three-dimensional image data subsets. The method includes optically representing at least one two-dimensional projection of an image data set that includes a two-dimensional subprojection of at least one image data subset, optically highlighting the at least one two-dimensional subprojection, receiving a user input directed to the selection of a certain subprojection, and optically representing, in accordance with said user input, at least one additional two-dimensional projection of the image data set that includes a two-dimensional projection of the selected image data subset. The method can be used for an image data set that is formed by fusion of at least two source image data sets. The source image data sets can especially comprise computer tomography and a positron-emission tomography image data set.

19 Claims, 5 Drawing Sheets

U.S. PATENT DOCUMENTS

| | | | | |
|---|---|---|---|---|
| 6,429,884 B1* | 8/2002 | Budz et al. | .................. | 715/848 |
| 6,556,696 B1* | 4/2003 | Summers et al. | ............ | 382/128 |
| 6,633,686 B1* | 10/2003 | Bakircioglu et al. | ........ | 382/294 |
| 7,324,104 B1* | 1/2008 | Bitter et al. | ................. | 345/420 |
| 7,327,872 B2* | 2/2008 | Vaillant et al. | ............. | 382/154 |
| 7,356,367 B2* | 4/2008 | Liang et al. | ................ | 600/407 |
| 7,447,343 B2* | 11/2008 | Barfuss et al. | ............. | 382/128 |
| 2008/0049991 A1* | 2/2008 | Gering | ...................... | 382/128 |

OTHER PUBLICATIONS

Alignement by maximization of mutual information , 1997.*

Image matching as a diffusion process: an analogy with Maxwell's demns; 1998.*

A global geometric framework for nonlinear dimensionality reduction, 2000.*

Marko Jahnke: "3D-Exploration von Volumendaten", Diplomarbeit, Rheinische Friedrich-Wilhelms-Univ.Bonn, Oct. 21, 1998, S.i-iv. pp. 13-20. pp. 33-48, pp. 75-92; HB.

David T.Gering: "A System for Surgical Planning and Guidance using Image Fusion and Interventional MR", Thesis at the Massachusetts Institute of Technology, Dec. 1999, XP 002293852, pp. 26-42.

P.Golland et al.: "AnatomyBrowser: A Novel Approach to Visualization and Integration of Medical Information", in: Computer Assisted Surgery, vol. 4: 129-143, 1999, XP 002280194.

* cited by examiner

METHOD OF NAVIGATION IN THREE-DIMENSIONAL IMAGE DATA

This application is the national phase under 35 U.S.C. §371 of PCT International Application No. PCT/EP2004/053041 which has an International filing date of Nov. 22, 2004, which designated the United States of America and which claims priority on German Patent Application number 103 56 272.9 filed Nov. 28, 2003 and on U.S. Provisional Patent Application No. 60/525,775 filed Nov. 28, 2003, the entire contents of which is hereby incorporated herein by reference.

FIELD

The invention generally relates to a method for navigating in three-dimensional electronic image data.

BACKGROUND

Electronic image data in more than two spatial dimensions (2D) are widely used for the most varied applications. Image data in three spatial dimensions (3D) are, for example, for three-dimensional simulations of processes, design and construction of spatial objects, and for measuring and optically reproducing such objects.

A particular application is constituted by methods of medical imaging technology where patient bodies are examined in three dimensions using radiological imaging methods, for example, and the three-dimensional examination data are acquired for further processing steps. On the one hand, it is possible in this case in diagnostics to identify examined body volumes of particular interest, so-called hot spots. In nuclear medicine, image regions of increased intensity that indicate the presence of a tumor in the region (increased tissue activity) are denoted as hot spots.

On the other hand, three-dimensional image data of the same body from different imaging methods can be brought together in a common display, a process termed fusion, in order to obtain a more informative image data record that can say more. Data from hot spots can play a particular role during fusion, since they permit the image data of precisely these body volumes from one imaging method to be viewed in the context of the image data of another imaging method. Such a fused image data record includes the hot spots as a partial image data record that can be particularly characterized.

An example of this can be, for example, the fusion of image data from positron emission tomography (PET) and from computed tomography (CT). The PET data constitute a diagnostic data record that includes information relating to specific metabolic functions of the patient body, and is therefore also denoted as functional image data or a functional data record. PET data essentially image soft parts. By contrast, the CT data also image anatomic features, such as bone structure, of the patient body, and therefore enable a viewer to have a substantially better orientation with the aid of the patient's anatomy. Consequently, fusing the functional PET data with the CT data substantially facilitates the anatomic assignment of hot spots identified with the aid of PET.

A particular problem with three-dimensional image data of all applications resides in the restricted possibilities for optical display. It is customary to use two-dimensional display units, computer screens as a rule, that offer only restricted possibilities of visualization in three dimensions. Examples of what is known are perspective displays, tomograms through planes of the object to be displayed, or rotating displays of the object which is visualized either partially in a transparent fashion or in a completely compact fashion.

A range of techniques that can be used in the way described are available for visualizing three-dimensional objects, and these are denoted as volume rendering technic (VRT). It is possible, inter alia, to use a maximum intensity projection (MIP) that respectively defines as a two-dimensional projection pixel the brightest pixel along each line of sight going through the three-dimensional object in a fashion starting from the (virtual) viewer. Alternatively, it is possible to undertake multiplanar reformatting (MPR), in the case of which different two-dimensional projections of the object are displayed, for example mutually perpendicular projections.

The restricted possibilities of optical illustration for three-dimensional image data firstly complicate the orientation in the objects displayed, since the viewer does not have immediate access to the depth information nor, in association therewith, to navigation within the data. This problem likewise arises in viewing, for example in diagnostic evaluation, as in the case of production, for example in three-dimensional construction.

Methods that use a rotating MIP of a functional data record for navigation exist in medical diagnostics. The disadvantage in this is that the anatomical assignment is thereby not yet always unique, for example when two hot spots lie very tightly next to one another. Consequently, these methods require a procedure in two stages, which is therefore troublesome: firstly, a slice plane through the hot spot of interest is laid on the rotating MIP (one-dimensional information), and then this slice must additionally be displayed and the position of the hot spot therein must be determined. Not until then is the three-dimensional information relating to the position available.

Tools for exploring volume data records that comprise two-dimensional and three-dimensional input units are known from the dissertation entitled "3D-EXPLORATION VON VOLUMENDATEN; Werkzeuge zur interaktiven Erkundung medizinischer Bilddaten" ["THREE-DIMENSIONAL EXPLORATION OF VOLUME DATA; Tools for interactive exploration of medical image data"], Oct. 21, 1998, by M. Jahnke. For example, a three-dimensional cursor object is proposed by which it is possible to select a partial volume of a volume data record; this partial volume can be understood as a region of interest (ROI) or voxel of interest (VOI). The partial volume selected in such a way can then be further used as an independent viewing volume within which the exploration is continued.

A further three-dimensional object proposed is referred to as the so-called prober, which constitutes a three-dimensional geometric object, for example a cube. The prober can be positioned like a cursor. It serves the purpose of determining scanned values of the volume respectively surrounded by the prober; in the case of a cube, these scanned values can be two-dimensional projections of the volume onto the cube faces. The tools proposed in the work of M. Jahnke in each case serve the manual exploration of partial volumes.

It is known from section 2.3.5 of the master's thesis entitled "A System for Surgical Planning and Guidance using Image Fusion and Interventional MR" by David T. Gering, submitted to the Massachusetts Institute of Technology in Dec. 1999, to click on a point of a first two-dimensional projection from a three-dimensional electronic data record in order respectively to set the center of the first projection and the centers of a second and a third projection having the same orientation as the first projection on the clicked points, the three projections respectively having different magnification factors, as is illustrated in FIGS. 2 to 7 there.

SUMMARY

It is the object of at least one embodiment of the invention to specify a method for navigating in three-dimensional image data records that automates the finding and determination of the three-dimensional position of three-dimensional partial image data records of particular interest, as well as the visualization thereof, and thereby facilitates the same.

At least one embodiment of the invention may yield the advantage that a user can use a conventional two-dimensional projection to select a partial image data record of particular interest, and thereby automatically obtains a further projection of the image data record that likewise again includes the partial image data record. The user need not firstly manually produce the further projection in which he lays a slice plane in the original projection. In this sense, the projection of the partial image data record is used, as it were, as an active link that can, for example, be selected by the user with the aid of a mouse or some other pointer unit, that is to say can be clicked on. The production of the tomograms required for identifying and for determining the position of the partial image data record is thereby intuitively configured and simplified.

In an advantageous refinement of at least one embodiment of the invention, use is made of an image data record that has been formed by fusing at least two source image data records. It is thereby possible to facilitate navigation for a user, particularly in image data records that have an information content extended by the fusion. The extended information content, in turn, can be used precisely for the purpose of automatically identifying partial image data records of possible interest from which the user can then make a manual selection.

In a further advantageous refinement of at least one embodiment of the invention, use is made of partial image data records which have all been formed from the same source image data record. It is thereby possible to use source image data records that are particularly suitable for identifying partial image data records possibly of interest, and a user automatically knows that the partial image data records have been selected with reference to the particular aspects of the source image data record used for identification.

In a further advantageous refinement of at least one embodiment of the invention, use is made as source image data records of at least one image data record from a computed tomography method and one from a positron emission tomography method. This combination is of particular interest with reference to medical diagnostics in cancer therapy, since CT image data records provide a viewer with the possibility of a particularly good orientation within the anatomy of a patient, while PET image data records are particularly well suited to identifying body volumes possibly at risk of cancer.

The method can be executed on a computer. For this purpose, it can either be installed on the computer, or it can be designed as a computer program product that facilitates executing or installing the method on a computer.

BRIEF DESCRIPTION OF THE DRAWINGS

Further advantageous refinements example embodiments of the invention follow from the detailed description and the figures.

Example embodiments of the invention are explained below with the aid of figures, in which.

DETAILED DESCRIPTION OF THE EXAMPLE EMBODIMENTS

Figure 1:
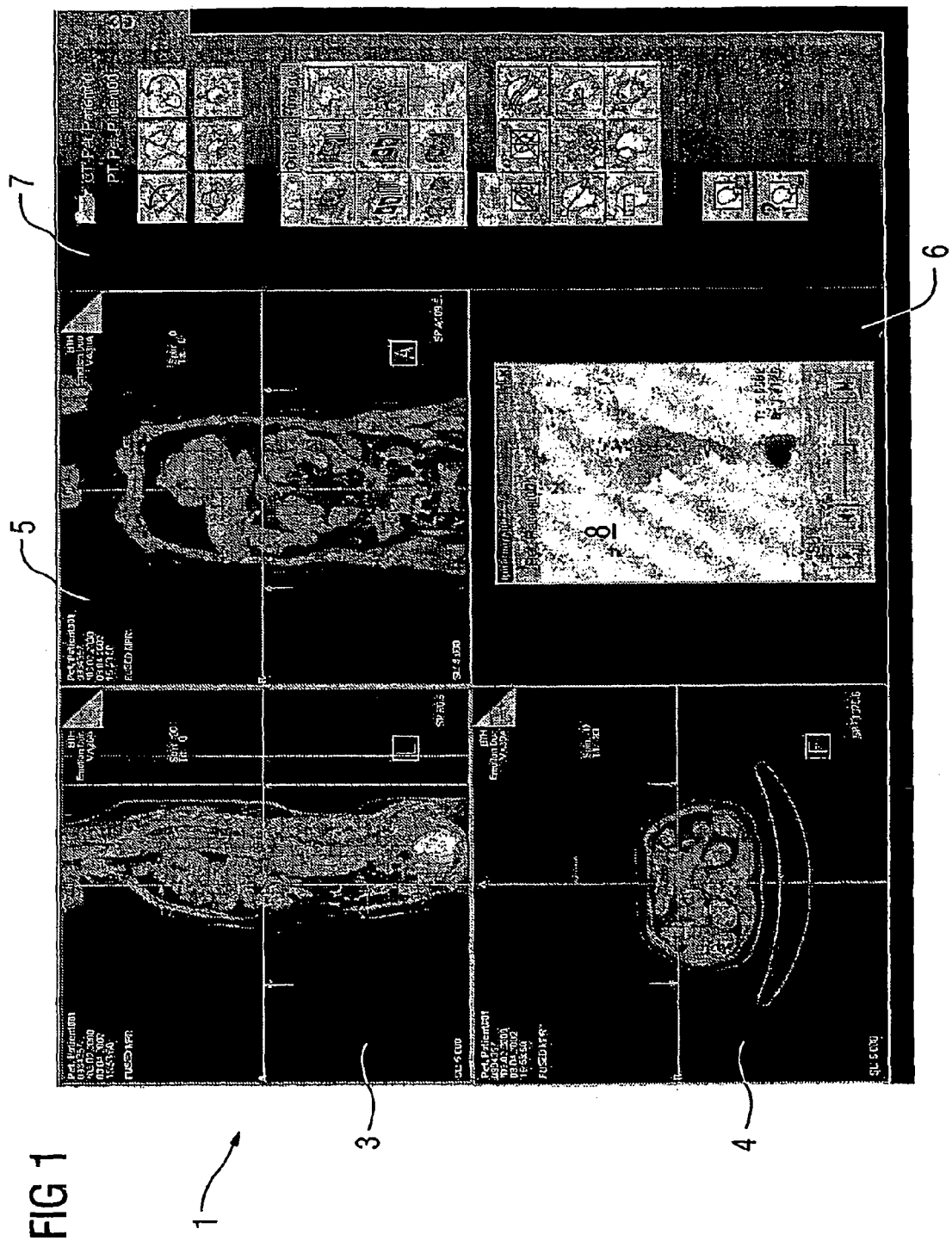
FIG. 1 shows a screenshot with two-dimensional projections of a three-dimensional image data record.

FIG. 1 illustrates a screenshot of a medical image processing workstation having two-dimensional projections of a three-dimensional image data record. A CT image data record is shown that was obtained by fusion with a PET image data record. The image data records have been previously registered, that is to say have been oriented with one another correctly in terms of scale and position, and have been acquired with all items of three-dimensional information.

The CT data record stands, for example, for a volume data record that includes anatomical information, and the PET data record stands, for example, for a volume data record of the same patient having functional information. The projection illustrated was obtained with the aid of the VRT and MIP rendering methods, which stand, for example, for any type of three-dimensional volume rendering, and with the aid of the MPR method, which stands, for example, for any type of slice plane rendering.

The methods support two forms of so-called clipping objects: clip planes (slice planes) and slabs (slice planes of defined thickness). In accordance therewith, the images of the functional data record can be both tomograms (being imaged onto the slice plane of the clip plane or of the slab), and volume images that are then projected into the clip plane or the slab exactly as the anatomical data record. A user can switch back and forth between volume display (MIP) and tomogram display (MPR).

An important aspect is also the possible parameter setting of the rendering methods used. In the case of VRT, parameters such as color, transparency or tissue assignment can be changed at any time in the CT parameter, in order to achieve the optimum view of the CT data record. In the case of MPR or MIP, it is possible at any time to change parameters such as windowing, color LUT, masking (that is to say threshold values that determine the visibility of information components).

Masking, in particular, is very important in order to restrict the display as far as possible only to the hot spots, but to mask out further information components of the data record which includes the hot spots, in order not to cover up too much of the anatomical information of the CT data record. Moreover, it is also possible to set a blending factor that describes the mixing ratio of CT and PET display. No further consideration will be given below to the various parameter settings.

The display shows a screenshot 1 having four so-called viewports 3, 4, 5, 6, that is to say screen segments that can respectively show different slice planes or slice layers. Using these different projections, which must be manually aligned and produced by a user with the aid of the tools and buttons in the screen segment 7, a user can display interesting partial image data records or hot spots and determine their three-dimensional position. For the purpose of better orientation, viewport 6 offers a rotation view 8, to be operated manually, of the PET data record.

Figure 2:
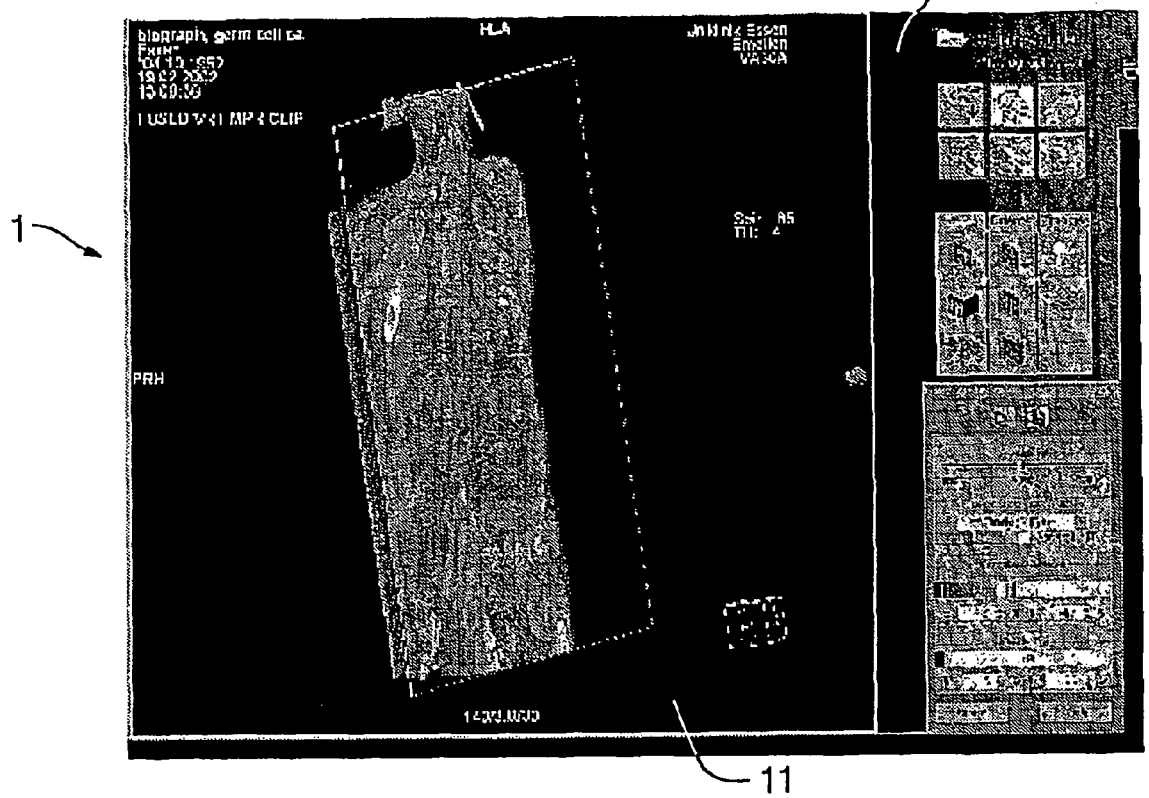
FIG. 2 shows a screenshot with slice plane and hot spots.

FIG. 2 illustrates a screenshot 1 with slice plane and hot spots in a data record which is again fused from CT and PET data. The screen 1 shows only a single viewport 11, in which a tomogram through the fused image data record is indicated by dashes. The projection in the viewport 11 includes a hot spot that can be detected as an optically emphasized image section in the abdominal space of the imaged patient body. The emphasized image section can be selected by a user, for example by mouse click, in order to produce further screenshots. There is no need for further manual actions by a user, and so the screen segment 7 includes only a reduced number of buttons and tools.

Figure 3:
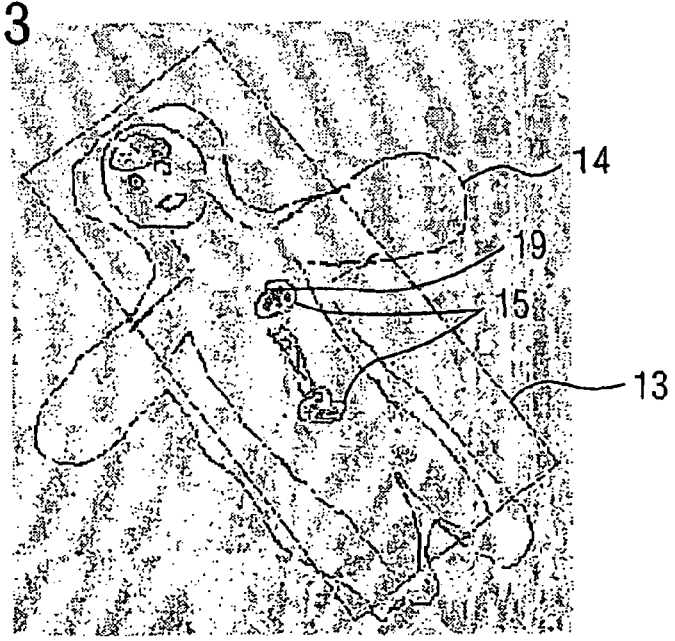
FIG. 3 shows a schematic view of a slice plane with hot spots.

FIG. 3 is a schematic of the projection from the preceding figure. It shows the slice plane 13 through the fused image data record that consists of a projection of the CT data record 14 and the PET data record 15. Hot spots 19 within the PET data record 15 are emphasized optically in a detectable way for a user, for example by way of particularly bright or striking coloring. The slice plane 13 illustrated is positioned and orientated such that a user can see the hot spots 19. The visualization of the hot spots 19 is functionalized in such a way that the user can select one of them manually, for example by clicking with a mouse. The hot spots 19 lie relatively tightly next to one another and are therefore not capable of being analyzed by an automated method.

Figure 4:
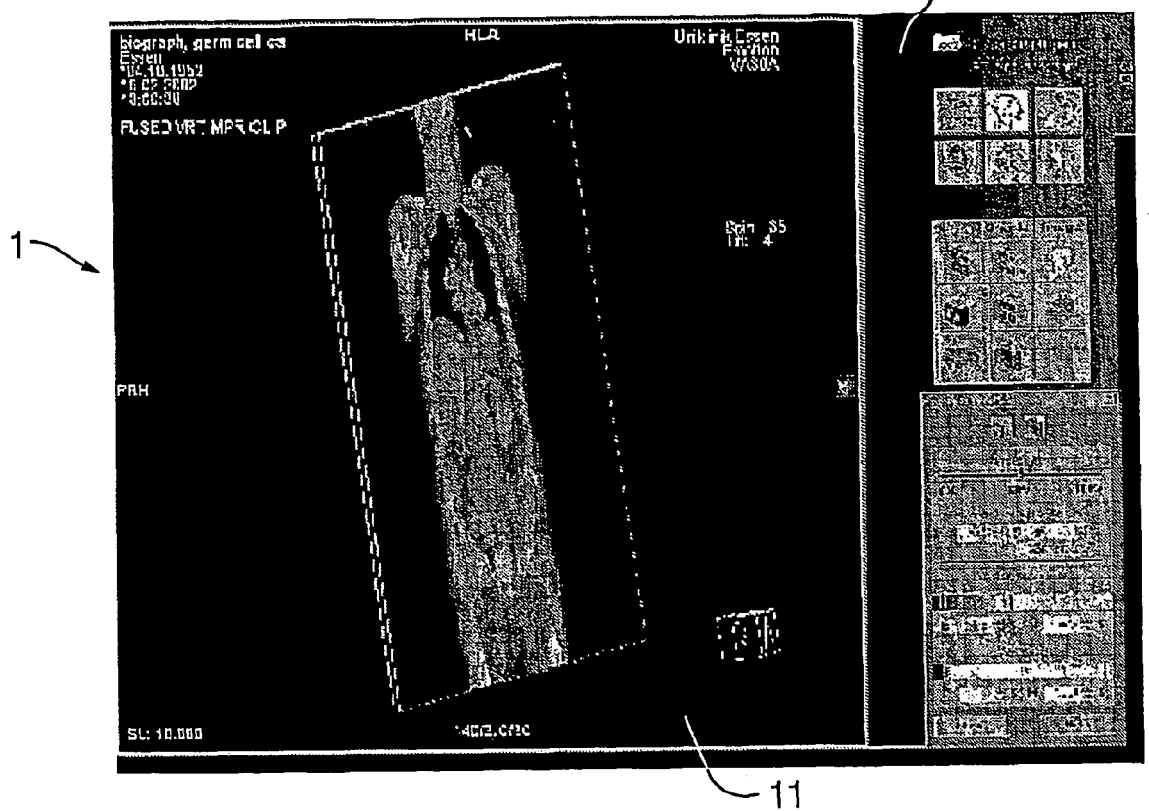
FIG. 4 shows a screenshot with slice plane and hot spots.
Figure 5:
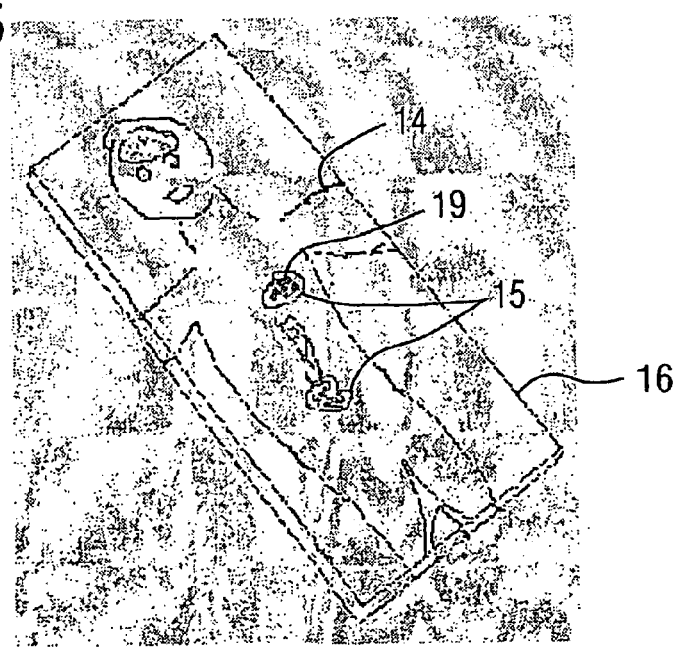
FIG. 5 shows a schematic view of a slice plane with hot spots.

FIGS. 4 and 5 depict illustrations in a fashion similar to the preceding FIGS. 2 and 3 with the use of the same reference numerals. Instead of a slice plane (clip plane), however, a slab 16 is illustrated, being detectable in the illustration in FIG. 5 as a box. Otherwise, reference is made to the description of the preceding figures.

Figure 6:
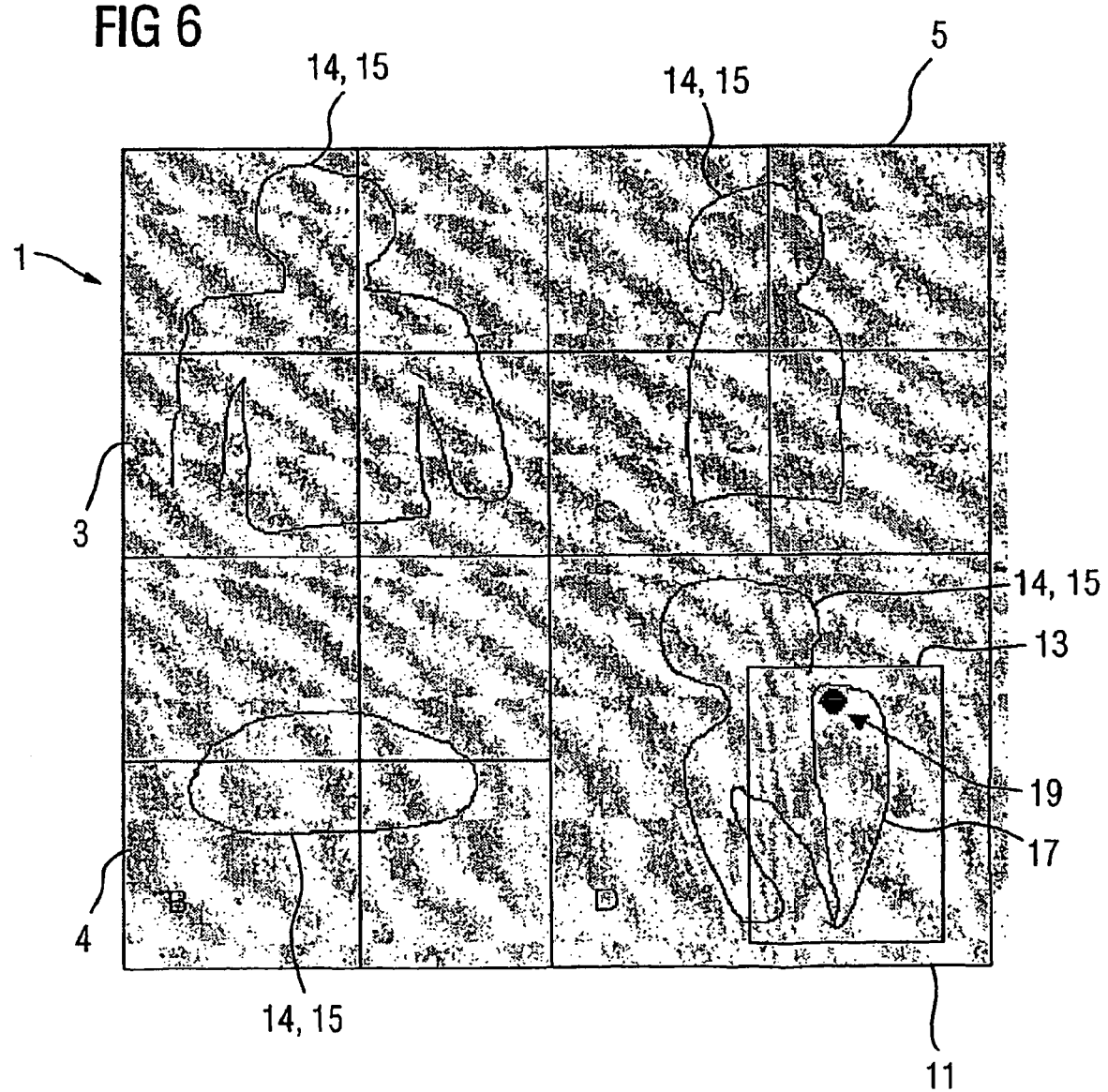
FIG. 6 shows a schematic screenshot with random tomograms.

FIG. 6 illustrates a screen view 1 with four viewports 3, 4, 5, 11. In accordance with the previous description, viewport 11 shows a functionalized projection to the extent that a user can select the hot spots 19 in the slice plane 13, for example by a mouse click. Viewports 3, 4, 5 show tomograms 14, 15 of the fused data record in randomly selected slice planes that do not include the hot spots 19. These are included only in the slice plane 13 in the tomogram 17. An exact localization of the hot spots 19 requires the selection of a display that shows the hot spots 19 also in the further, different projections in the viewports 3, 4, 5.

To this end, the user firstly selects one of the above-described forms of display in order to obtain an optimum view of the hot spots 19. At the viewport 11, it is possible to rotate spatially into the correct view, and to displace the slice plane 13 in order to focus into the hot spot 19. Three-dimensional depth information is provided indirectly on this navigation image, and enables the hot spot 19 to be selected with a mouse click. So-called volume picking, which automatically focuses the screen view 1 onto the hot spot 19 for the user, is initiated by a mouse click on the hot spot 19.

Firstly, the clip plane 13 or, if appropriate, the centroid of the slab in the viewport 11 is displaced in the fusion display into the selected hot spot 19, while secondly all other images displayed in the other viewports 3, 4, 5 on the screen are likewise displaced into the hot spot 19. Consequently, a screen view 1 that is optimum for identifying a hot spot 19 is automatically produced for the user without the need for him to manually set projections suitable in terms of rotation angle and depth in all viewports 3, 4, 5. As a result of the volume picking, the images are displaced from the viewports 3, 4, 5 into the selected hot spot 19, as is likewise the slice plane 13 in the viewport 11.

Consequently, the hot spot 19 can be sought very easily in the viewport 11, and it is then possible to focus all four viewports 3, 4, 5, 6 onto the hot spot 19 with a mouse click.

Figure 7:
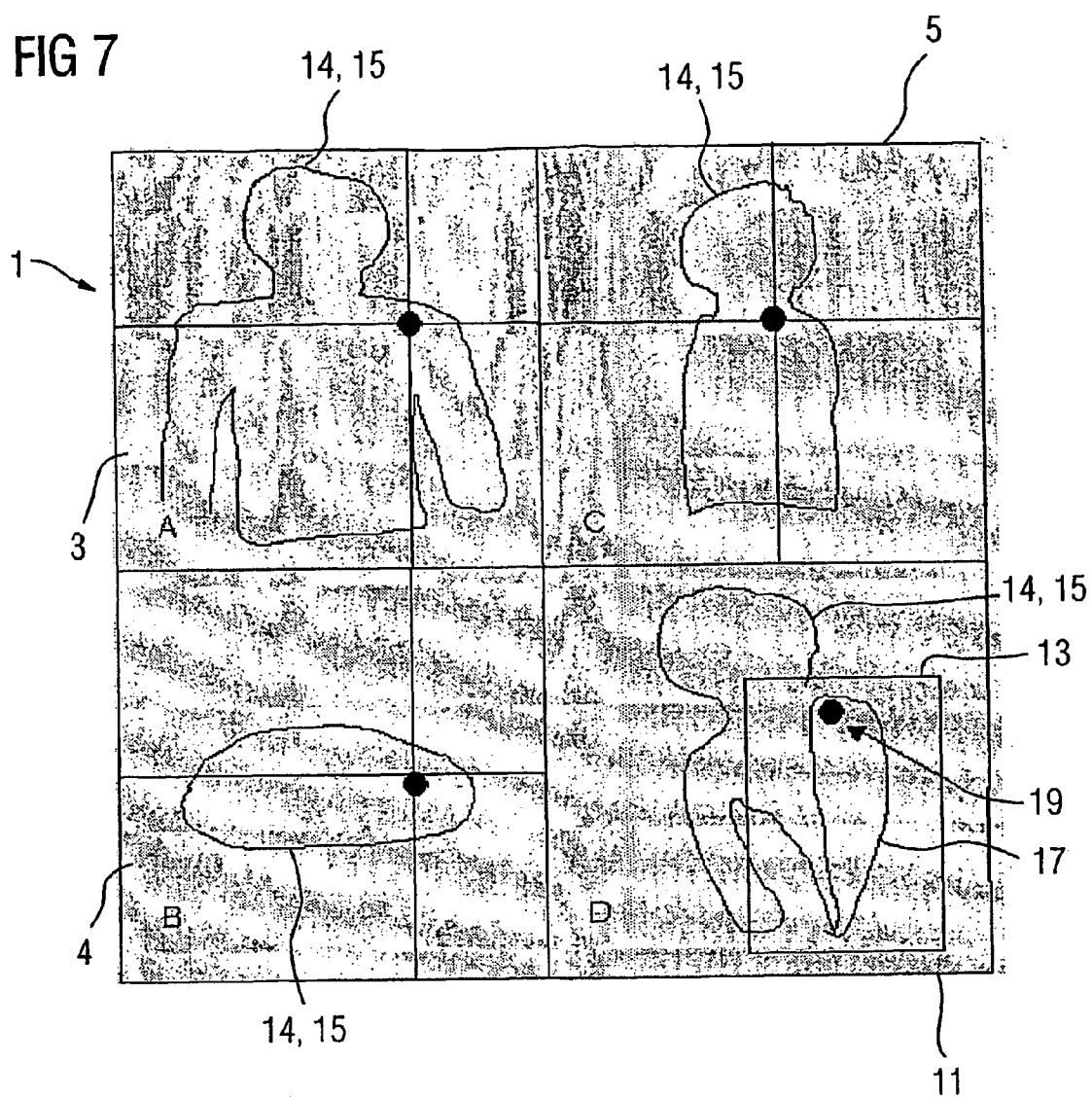
FIG. 7 shows a schematic screenshot with tomograms through a hot spot.

Using the same reference numerals as in the preceding figure, FIG. 7 illustrates the screen view 1 obtained as a result of volume picking and optimized with regard to the hot spot 19 selected by the user. The slice plane 13 is positioned in the viewport 11 such that the tomogram 17 shows a projection together with hot spot 19. The remaining images now show other mutually referencing tomograms either of a single or the fused data records, which likewise respectively include the hot spot 19. The tomograms reference one another mutually, as is indicated by marking lines A, B, C, which run through all viewports 3, 4, 5, in each case showing the selected hot spot 19. The hot spot 19 is thereby displayed in a localized fashion that is optimally visible to the user.

Figure 8:
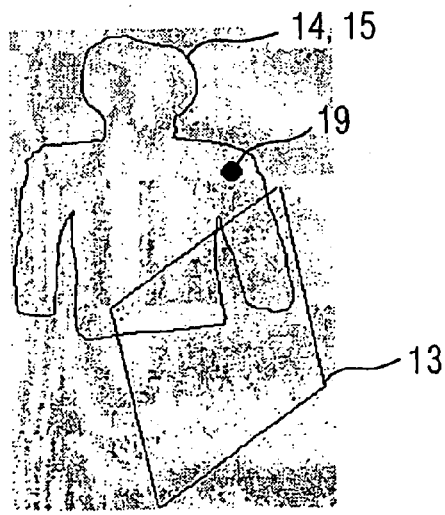
FIG. 8 shows a schematic view of a random slice plane.
Figure 9:
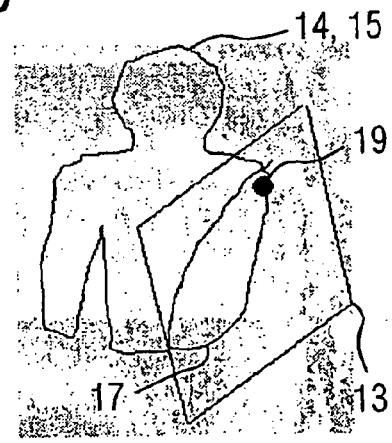
FIG. 9 shows a schematic view of a slice plane through a hot spot.

The process of focusing that was explained in the preceding FIGS. 6 and 7 with reference to the viewport 11 there, is illustrated once more in FIGS. 8 and 9. FIG. 8 illustrates the tomogram of the fused image data record 14, 15 that includes a hot spot 19. The slice plane 13 is randomly positioned and includes no projection of the hot spot 19. In FIG. 9, the slice plane 13 is displaced such that it cuts the hot spot 19 and includes a projection 17 of the fused image data record.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for navigating in three-dimensional electronic image data records, the image data records including three-dimensional partial image data records, the method comprising:

optically displaying at least two mutually perpendicular two-dimensional projections of an image data record, at least one of the two projections including at least one two-dimensional partial projection of at least one partial image data record;

optically emphasizing the at least one two-dimensional partial projection; functionalizing the at least one optically emphasized partial projection such that the at least one optically emphasized partial projection is selectable by a user input;

receiving a user input directed toward the selection of the at least one functionalized partial projection; and automatically displacing, as a function of the user input, the at least one perpendicular two-dimensional projection not including the at least one partial projection wherein, it is displaced into the at least one partial projection after displacement.

2. The method as claimed in claim 1, wherein the image data record is formed by fusing at least two source image data records.

3. The method as claimed in claim 2, wherein all the partial image data records are formed from the same source image data record.

4. The method as claimed in claim 2, wherein the source image data records includes a source image data record obtained from a computed tomography method, and a source image data record obtained from a positron emission tomography method.

5. A computer readable medium storing a computer program that facilitates at least one of executing and installing the method as claimed in claim 1 on a computer.

6. The method as claimed in claim 3, wherein the source image data records includes a source image.

7. A computer readable medium storing a computer program that facilitates at least one of executing and installing the method as claimed in claim 2 on a computer.

8. A computer readable medium storing a computer program that facilitates at least one of executing and installing the method as claimed in claim 3 on a computer.

9. A computer readable medium storing a computer program that facilitates at least one of executing and installing the method as claimed in claim 4 on a computer.

10. A computer readable medium storing a computer program that facilitates at least one of executing and installing the method as claimed in claim 6 on a computer.

11. A computer readable medium including program segments for, when executed on a computer, causing the computer to implement the method of claim 1.

12. A computer readable medium including program segments for, when executed on a computer, causing the computer to implement the method of claim 2.

13. A computer readable medium including program segments for, when executed on a computer, causing the computer to implement the method of claim 3.

14. A computer readable medium including program segments for, when executed on a computer, causing the computer to implement the method of claim 4.

15. A computer readable medium including program segments for, when executed on a computer, causing the computer to implement the method of claim 6.

16. An apparatus for navigating in three-dimensional electronic image data records, the image data records including three-dimensional partial image data records, the apparatus comprising:

means for optically displaying at least two mutually perpendicular two-dimensional projections of an image data record, at least one of the two projections including at least one two-dimensional partial projection of at least one partial image data record;

means for optically emphasizing the at least one two-dimensional partial projection;

means for functionalizing the at least one optically emphasized partial projection such that the at least one optically emphasized partial projection is selectable by a user input;

means for receiving a user input directed toward the selection of the at least one functionalized partial projection; and means for automatically displacing, as a function of the user input, the at least one perpendicular two-dimensional projection not including the at least one partial projection wherein, it is displaced into the at least one partial projection after displacement.

17. The apparatus as claimed in claim 16, wherein the image data record is formed by fusing at least two source image data records.

18. The apparatus as claimed in claim 17, wherein all the partial image data records are formed from the same source image data record.

19. The apparatus as claimed in claim 17, wherein the source image data records includes a source image data record obtained from a computed tomography method, and a source image data record obtained from a positron emission tomography method.

* * * * *